US012592216B2

(12) United States Patent
Kim et al.

(10) Patent No.: US 12,592,216 B2
(45) Date of Patent: Mar. 31, 2026

(54) ACTIVE NOISE CONTROL METHOD AND SYSTEM FOR VEHICLES

(71) Applicants: Hyundai Motor Company, Seoul (KR); Kia Corporation, Seoul (KR)

(72) Inventors: Jea Kwan Kim, Anyang-si (KR); Bo Yong Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 176 days.

(21) Appl. No.: 18/611,113

(22) Filed: Mar. 20, 2024

(65) Prior Publication Data

US 2025/0078799 A1 Mar. 6, 2025

(30) Foreign Application Priority Data

Aug. 28, 2023 (KR) ........................ 10-2023-0112995

(51) Int. Cl.
*G10K 11/178* (2006.01)

(52) U.S. Cl.
CPC .. *G10K 11/17817* (2018.01); *G10K 11/17881* (2018.01); *G10K 2210/12821* (2013.01); *G10K 2210/3022* (2013.01); *G10K 2210/3026* (2013.01); *G10K 2210/3027* (2013.01); *G10K 2210/30351* (2013.01)

(58) Field of Classification Search
CPC ....... G10K 11/17817; G10K 11/17881; G10K 2210/12821; G10K 2210/3022; G10K 2210/3026; G10K 2210/3027; G10K 2210/30351
See application file for complete search history.

(56) References Cited

U.S. PATENT DOCUMENTS

| | | | | |
|---|---|---|---|---|
| 2022/0230621 | A1 * | 7/2022 | Sakamoto | G10K 11/17823 |
| 2023/0282194 | A1 * | 9/2023 | Kim | G10K 11/17854 |
| 2024/0144905 | A1 * | 5/2024 | Basu | G10K 11/17825 |

FOREIGN PATENT DOCUMENTS

| | | | | |
|---|---|---|---|---|
| CN | 117174063 A * | 12/2023 | G10K 11/178 |
| EP | 2701143 A1 * | 2/2014 | G10K 11/17881 |
| KR | 10-2021-0003671 | 1/2021 | |
| KR | 20240163317 A * | 11/2024 | H04R 3/005 |
| WO | WO-2024047691 A1 * | 3/2024 | G10K 11/178 |

* cited by examiner

*Primary Examiner* — David L Ton
(74) *Attorney, Agent, or Firm* — Fish & Richardson P.C.

(57) ABSTRACT

An active noise control method and system for a vehicle are provided. The active noise control method for a vehicle includes performing active noise control (ANC) to reduce noise introduced from the outside of the vehicle to the inside of the vehicle and received through a microphone, determining whether a level of residual noise of the noise reduced by the ANC is greater than a threshold value, and performing secondary path model re-measurement when an engine of the vehicle is turned off if the level of the residual noise is greater than the threshold value.

12 Claims, 4 Drawing Sheets

ACTIVE NOISE CONTROL METHOD AND SYSTEM FOR VEHICLES

CROSS-REFERENCE TO RELATED APPLICATION

This application claims priority to Korean Patent Application No. 10-2023-0112995, filed on Aug. 28, 2023, in the Korean Intellectual Property Office, the disclosure of which is incorporated herein by reference.

TECHNICAL FIELD

The present invention relates to a vehicle active noise control system, and more specifically, to a method and system for correcting errors in a secondary path model in a vehicle active noise control system.

BACKGROUND

Active noise control (ANC) systems employ both feedforward and feedback structures to adaptively diminish undesired noise in specific environments, such as a vehicle cabin. These systems typically mitigate or eliminate unwanted noise by generating counteracting sound waves that destructively interfere with the undesirable audible noise. In this interference, the noise and the "anti-noise," which is approximately equal in magnitude but opposite in phase, reduce a sound pressure level (SPL) at a designated location.

Within the listening environment of a vehicle cabin, potential sources of undesired noise include sounds emitted by the engine, interactions between the tires of the vehicle and a road surface on which the vehicle is traveling, and vibrations from other parts of the vehicle. Consequently, the nature of unwanted noise varies based on factors such as vehicle's speed, road conditions, and driving conditions.

In this regard, a conventional method suggests determining and mitigating noise boosting caused by an error in the secondary path model error in real time within an ANC system. However, a drawback is that a model error might be identified only after noise boosting, leading to a decline in stability of the ANC system. Furthermore, the secondary path model cannot be modified, thereby preventing the fundamental resolution of the model error's root cause.

Therefore, in this technology domain, there exists a need for a system that ensures the performance and stability of ANC. This involves recommending re-measurement of a secondary path model to a user when the ANC system's performance or stability degrades due to a model error. The system should also automatically conduct the re-measurement of the secondary path model and implement an optimized secondary path model tailored to the specific vehicle.

SUMMARY

The present invention is directed to recommending re-measurement of a secondary path model to a user when the performance or stability of an ANC system deteriorates due to a secondary path model error and to automatically perform secondary path model re-measurement.

The present invention is also directed to a technology for securing ANC performance and stability by applying a secondary path model optimized for a corresponding vehicle. The present invention is also directed to re-measuring a secondary path model optimized for a vehicle before occurrence of noise reduction performance deterioration, noise boosting, and divergence due to a secondary path model error and reflect the same in noise reduction.

According to one aspect of the present application, an active noise control method for a vehicle can include performing active noise control (ANC) to reduce noise introduced from the outside of the vehicle to the inside of the vehicle and received through a microphone, determining whether a level of residual noise of the noise reduced by the ANC is greater than a threshold value, and performing secondary path model re-measurement when an engine of the vehicle is turned off if the level of the residual noise is greater than the threshold value.

In some implementations, the active noise control method may further include updating a secondary path model for performing the ANC on the basis of a result of the secondary path model re-measurement when the engine of the vehicle is started, and reducing noise introduced from the outside to the inside of the vehicle by re-performing ANC on the basis of the updated secondary path model.

In some implementations, the performing of the secondary path model re-measurement may include outputting white noise including all frequency ranges through a speaker for any time, receiving the output sound through the microphone, and storing the sound in a memory, and updating the secondary path model on the basis of the sound output through the speaker and the sound input through the microphone.

In some implementations, the performing of the secondary path model re-measurement may include receiving information on whether a user agrees to perform secondary path model re-measurement from the user through an input/output interface if the level of the residual noise is greater than the threshold value, upon receiving agreement for secondary path model re-measurement from the user, outputting white noise including all frequency ranges through the speaker for any time when the engine of the vehicle is turned off and all occupants of the vehicle have alighted, receiving the output sound through the microphone, and storing the sound in the memory.

In some implementations, the re-performing of ANC may include re-performing ANC when the engine of the vehicle is turned on again.

In accordance with another aspect of the present application, an active noise control system for a vehicle, can include a processor configured to perform active noise control (ANC) to reduce noise introduced from the outside of the vehicle to the inside of the vehicle and received through a microphone, determine whether a level of residual noise of the noise reduced by the ANC is greater than a threshold value, and perform secondary path model re-measurement when an engine of the vehicle is turned off if the level of the residual noise is greater than the threshold value.

In some implementations, the processor may be configured to update a secondary path model for performing the ANC on the basis of a result of the secondary path model re-measurement when the engine of the vehicle is started, and reduce noise introduced from the outside to the inside of the vehicle by re-performing ANC on the basis of the updated secondary path model.

In some implementations, the processor may be configured to output white noise including all frequency ranges through a speaker for any time, receive the output sound through the microphone and store the sound in a memory, and update the secondary path model on the basis of a relationship between the sound output through the speaker and the sound input through the microphone.

In some implementations, the processor may be configured to receive information on whether a user agrees to perform secondary path model re-measurement from the user through an input/output interface if the level of the residual noise is greater than the threshold value, and upon receiving agreement for secondary path model re-measurement from the user, output white noise including all frequency ranges through the speaker for any time when the engine of the vehicle is turned off and all occupants of the vehicle have alighted, receive the output sound through the microphone, and store the sound in the memory.

In some implementations, re-performing of ANC may be performed when the engine of the vehicle is turned on again.

DETAILED DESCRIPTION

Figure 1:
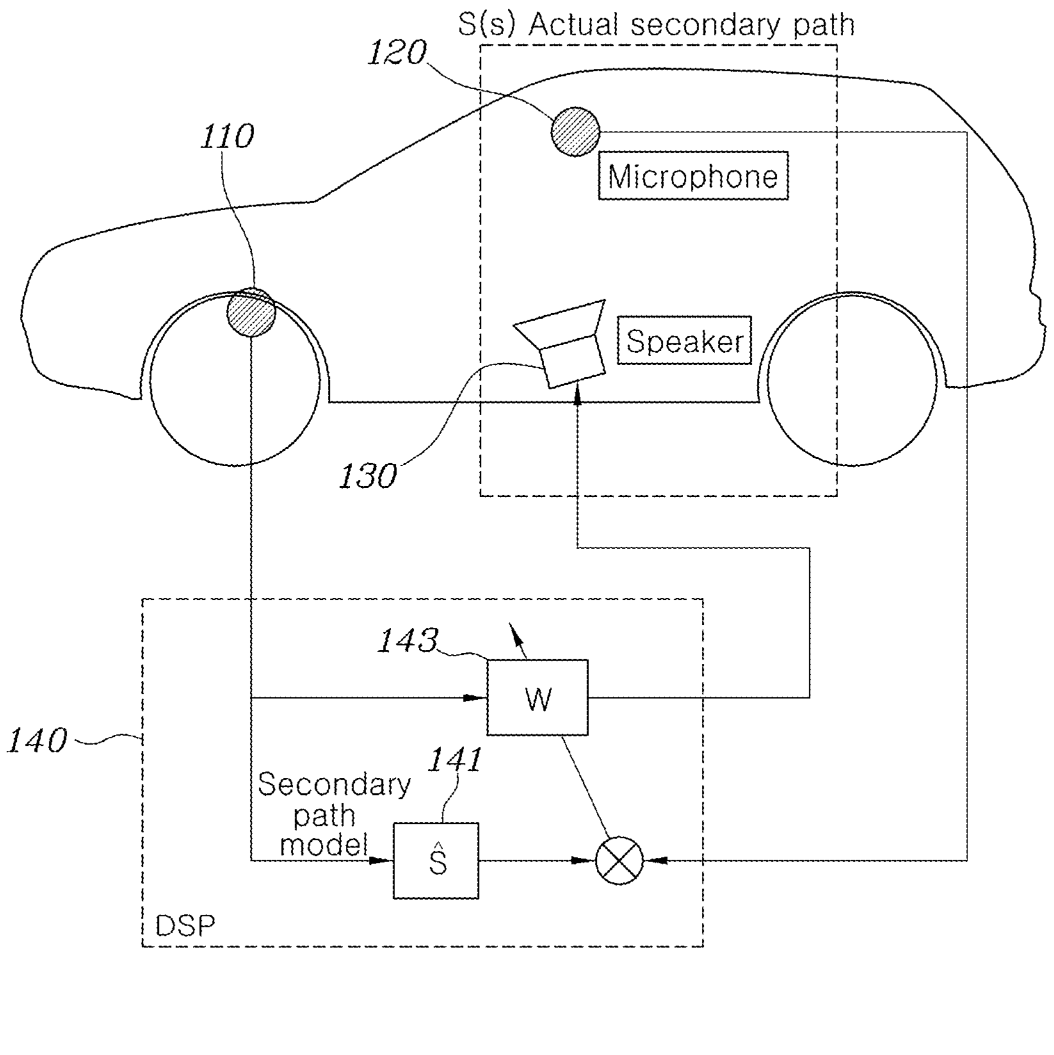
FIG. 1 is a diagram illustrating an example of a conventional active noise control (ANC) system.

FIG. 1 shows an example of a typical active noise control (ANC) system.

Referring to FIG. 1, an accelerometer 110 detects vehicle body vibration from a road surface and generates a reference signal, and a microphone 120 detects residual noise after control and sends the residual noise signal to a digital signal processor (DSP) 140. The DSP 140 receives a sensor signal, calculates an adaptive algorithm using Filtered Least Mean Square (FxLMS), outputs a signal, and filters a secondary path model. In FIG. 1, S(s) represents an actual secondary path which is an electrical and acoustic path between a speaker 130 and the microphone 120, and ŝ 141 represents a secondary path model which is a digital filter obtained by measuring the actual secondary path by the DSP and modeling the same into a transfer function. During development, the secondary path model is measured, modeled, and applied to be almost identical to the actual secondary path. However, after mass production, cumulative errors between the secondary path model and the secondary path may occur over a long period of time due to various factors such as changes in a vehicle interior structure by a customer and aging of speakers. Further, W 143 is an adaptive filter coefficient by which a reference signal is received and an output signal is calculated and output, and the value thereof is updated in real time.

In the ANC system as shown in FIG. 1, the DSP 140 outputs white noise including all frequency ranges through the speaker 130, and at the same time, sound detected through the microphone 120 is received by the DSP 140 and stored, and thus the sound output through the speaker 130 can be defined as a secondary path output signal and the sound detected through the microphone 120 can be defined as a secondary path input signal. Using this relationship between the input signal and the output signal, a transfer function of the secondary path can be calculated, modeled as a digital filter, and applied to the algorithm as a secondary path model.

Figure 2:
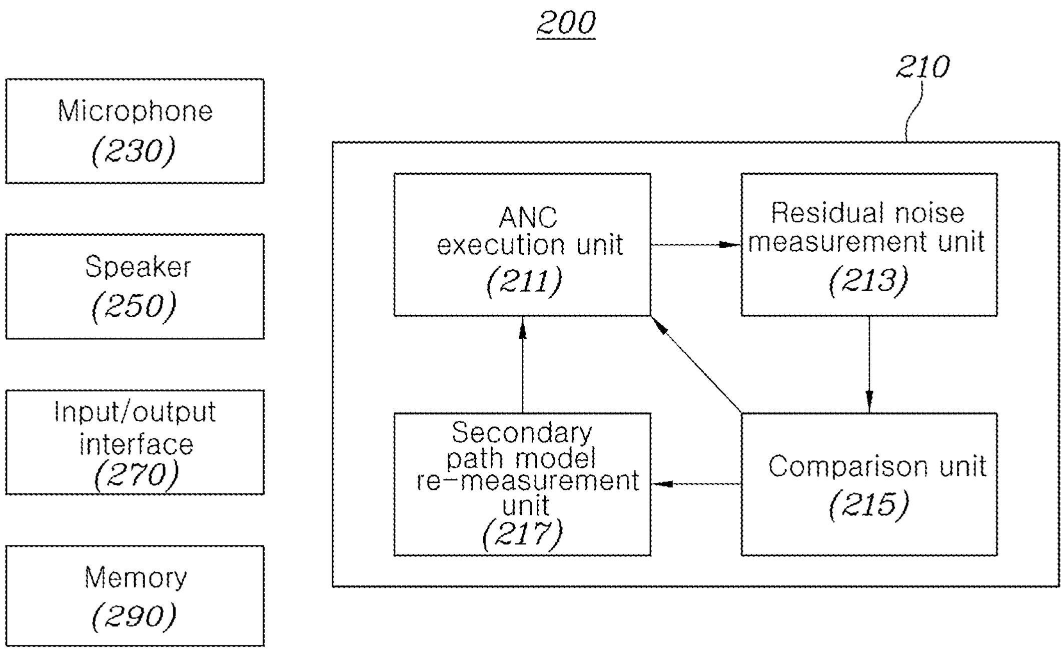
FIG. 2 is a block diagram illustrating an example of an ANC system.

FIG. 2 is a block diagram showing an example of an active noise control (ANC) system.

Referring to FIG. 2, the active noise control system 100 can include a processor 210, a microphone 230, a speaker 250, an input/output interface 270, and a memory 290.

The processor 210 includes an ANC execution unit 211, a residual noise measurement unit 213, a comparison unit 215, and a secondary path model re-measurement unit 217.

The ANC execution unit 211 reduces external noise of the vehicle received from the microphone 230. For example, the ANC execution unit 211 generates sound waves having the same magnitude and opposite phase to the external noise of the vehicle to be transmitted to an occupant inside the vehicle and reproduces the same through the speaker 250 to reduce the external noise of the vehicle.

Here, the ANC execution unit 211 may reduce the external noise of the vehicle using a secondary path model algorithm using the secondary path model which is a digital filter obtained by measuring an actual secondary path S(s) which is the electrical and acoustic path between the speaker 250 and the microphone 230 and an actual secondary path in the DSP and modeling the same into a transfer function.

The residual noise measurement unit 213 measures residual noise remaining after the external noise of the vehicle is reduced by the ANC execution unit 211.

The comparison unit 215 determines whether the level of the residual noise measured by the residual noise measurement unit 213 is greater than a threshold value. Here, if a secondary path model error exceeds a certain level as a result of vehicle external noise reduction by the ANC execution unit 211, the level of the residual noise also increases as a result of vehicle external noise reduction by the ANC execution unit 211.

Therefore, through comparison between the residual noise level and the threshold value by the comparison unit 215, it is possible to determine whether the secondary path model error of the ANC execution unit 211 exceeds a certain level.

The secondary path model re-measurement unit 217 performs secondary path model re-measurement if the level of the residual noise of the vehicle external noise measured by the residual noise measurement unit 213 is greater than the threshold value.

Here, the secondary path model re-measurement unit 217 receives information on whether a user agrees to perform secondary path model re-measurement from the user through the input/output interface 270, and if the user agrees, white noise including all frequency ranges is output for a preset predetermined period of time through the speaker 250, and at the same time, sound is received through the microphone 230 and stored in the memory 290 after the vehicle engine is turned off and all occupants of the vehicle alight.

Here, the predetermined period of time may be set to any time, for example, 5 seconds.

Here, the secondary path model re-measurement unit 217 updates the secondary path model for performing ANC on the basis of the sound output through the speaker 250 and the sound received through the microphone 230.

Here, the transfer function of the generated secondary path is used to update the next algorithm using the secondary path model of the ANC execution unit 211.

At least one microphone 230 is disposed inside the vehicle to detect vehicle external noise generated due to interaction between the tires of the vehicle and a road surface.

Here, the microphone 230 may be disposed, for example, in a headrest of a seat, and may be provided in the headliner of the vehicle or in various other places to detect vehicle external noise.

The speaker 250 outputs an anti-noise signal for signals received by the microphone 230, generated by the processor 210.

The input/output interface 270 receives user input regarding whether to perform automatic secondary path model re-measurement from the user.

Figure 3:
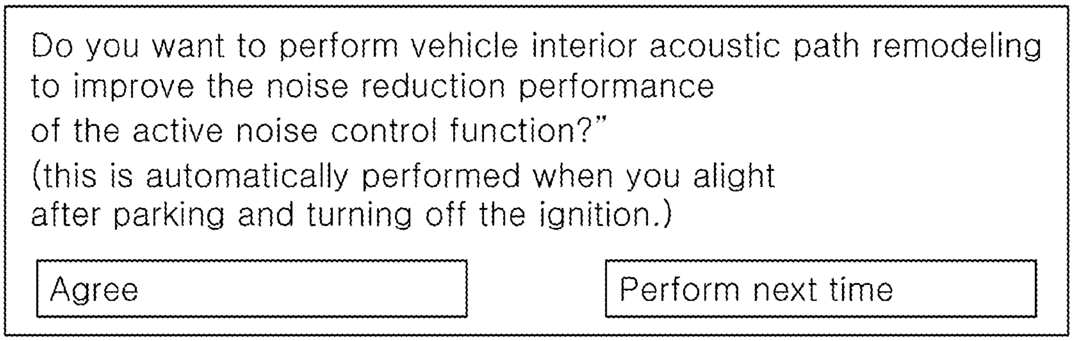
FIG. 3 is a diagram illustrating an example of a query for receiving input regarding whether to perform secondary path model re-measurement which can be displayed on a display screen of an input/output interface.

For example, the input/output interface 270 may receive user input by displaying, on a display screen as shown in FIG. 3, a query such as "Do you want to perform vehicle interior acoustic path remodeling to improve the noise reduction performance of the active noise control function?" (this is automatically performed when you alight after parking and turning off the ignition.) along with buttons for selecting any of "Agree" or "Perform next time."

The memory 290 may be various types of volatile or non-volatile storage media. Here, the memory 290 may store sounds input through the microphone 230 when white noise including all frequency ranges output through the speaker 250 is input through the microphone 230 during secondary path model re-measurement.

Figure 4:
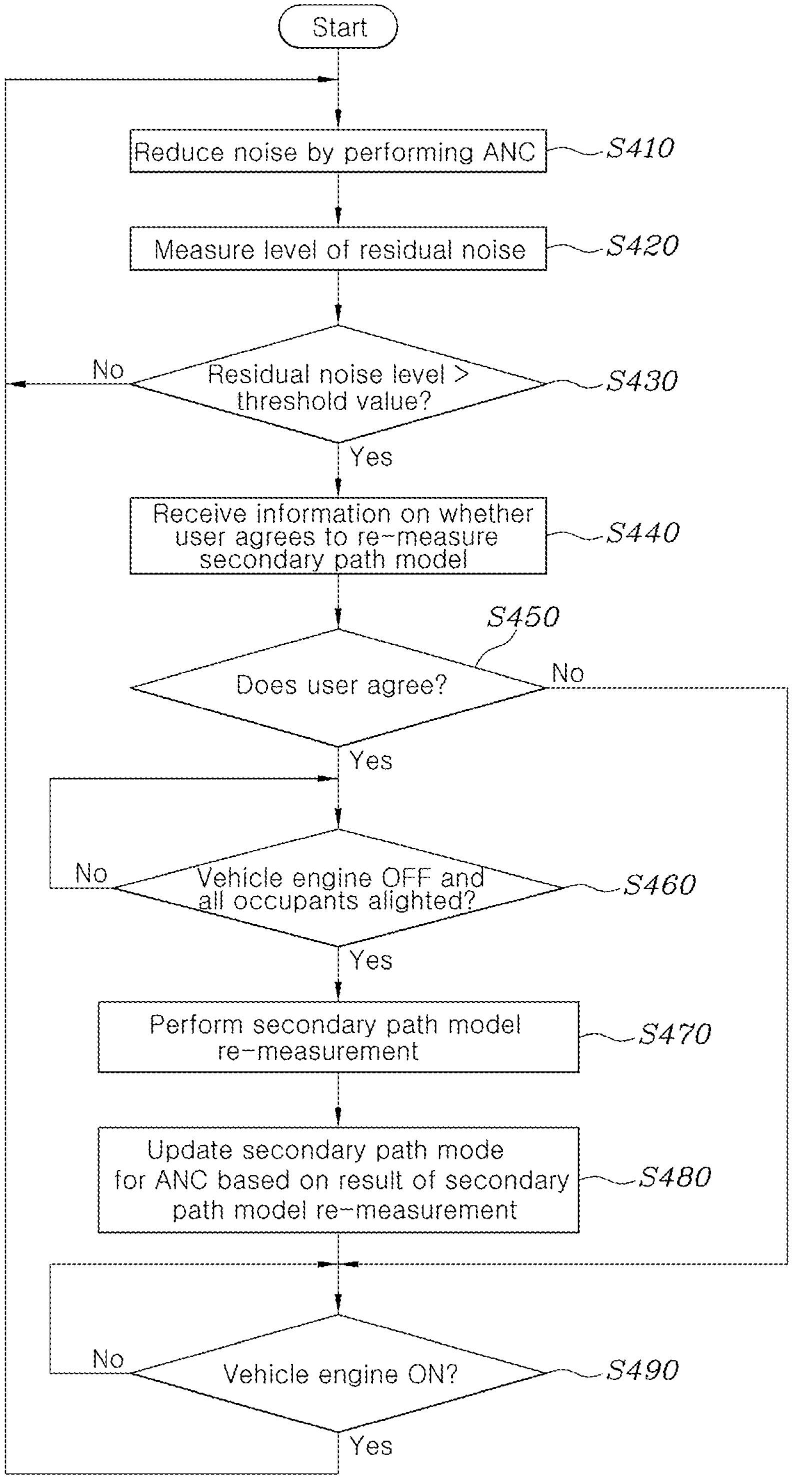
FIG. 4 is a flowchart showing an example of an active noise control (ANC) method.

FIG. 4 is a flowchart showing an example of an active noise control (ANC) method. The active noise control method can be performed by the processor 210 shown in FIG. 2.

Referring to FIG. 4, the processor 210 performs ANC to reduce noise introduced from the outside to the inside of the vehicle, received by the microphone 230 (S410).

For example, the processor 210 generates sound waves having the same magnitude and opposite phase to the external noise of the vehicle to be transmitted to an occupant inside the vehicle and reproduces the same through the speaker 250 to reduce the external noise of the vehicle.

Here, the processor 210 may reduce the external noise of the vehicle using a secondary path model algorithm using the secondary path model which is a digital filter obtained by measuring an actual secondary path S(s) which is the electrical and acoustic path between the speaker 250 and the microphone 230 and an actual secondary path in the DSP and modeling the same into a transfer function.

Further, the processor 210 measures the level of residual noise of the reduced vehicle external noise (S420).

In addition, the processor 210 determines whether the level of the residual noise of the measured vehicle external noise is greater than the threshold value (S430), and if it is greater than the threshold value, receives information on whether the user agrees on secondary path model re-measurement through the input/output interface 270 (S440).

Here, if a secondary path model error exceeds a certain level as a result of vehicle external noise reduction, the level of the residual noise also increases as a result of vehicle external noise reduction.

Therefore, by comparing the residual noise level with the threshold value, it can be determined whether the secondary path model error exceeds the certain level.

Additionally, the processor 210 determines whether user agreement has been received (S450), and upon receiving user agreement, determines whether the vehicle engine is turned off and all occupants have alighted (S460).

If the vehicle engine is turned off and all occupants have alighted as a result of the determination in step S460, the processor 210 performs secondary path model re-measurement (S470).

Here, the processor 210 outputs white noise including all frequency ranges through the speaker 250 for a preset predetermined period of time, and simultaneously, receives sound through the microphone 230 and stores the same in the memory 290.

Here, the predetermined period of time may be set to any time, for example, 5 seconds.

Additionally, the processor 210 updates the secondary path model for performing ANC on the basis of the sound output through the speaker 250 and the sound received through the microphone 230 (S480).

Here, the updated secondary path model can be used for the next ANC.

The processor 210 determines whether the vehicle engine is turned on (S490), and when the vehicle engine is turned on, performs ANC on the basis of the secondary path model updated in step S480 to reduce noise (S410).

Figure 5:
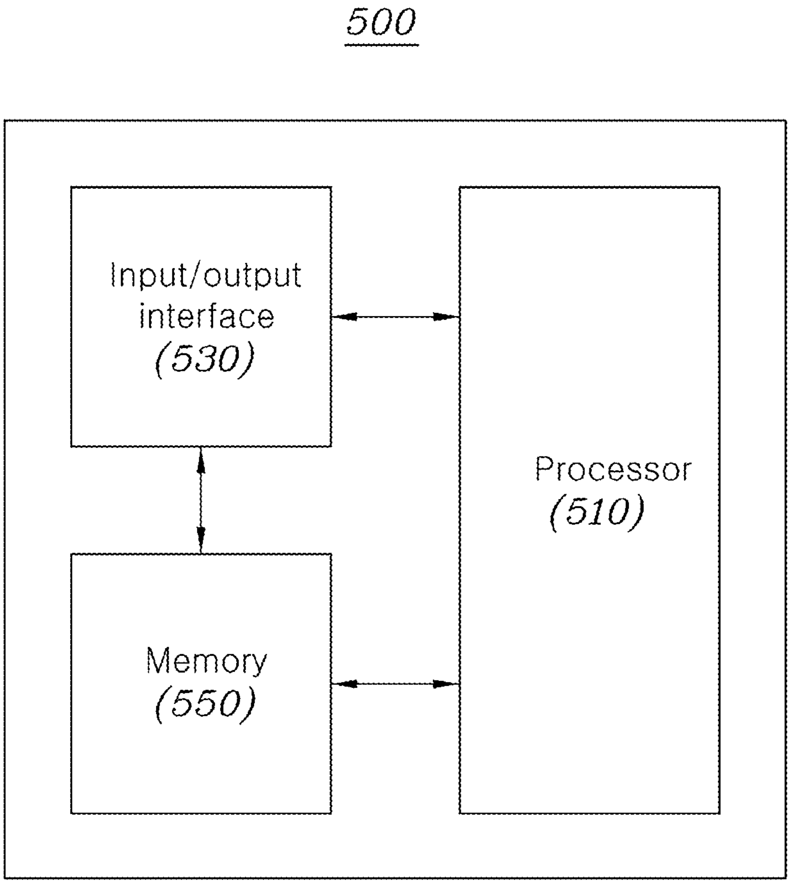
FIG. 5 is a diagram illustrating an example of a computer system.

FIG. 5 shows an example of a computer system.

Referring to FIG. 5, implementations of the present disclosure may be implemented in a computer system such as a computer-readable recording medium. As shown in FIG. 5, the computer system 500 includes a processor 510, an input/output interface 530, and a memory 550.

The processor 510 implements the active noise control method for vehicles proposed this specification.

Specifically, the processor 510 implements all operations of the processor 210 in the active noise control system 200 described in the implementation of the present disclosure and performs all operations of the active noise control method according to FIG. 4.

For example, the processor 510 reduces noise introduced from the outside to the inside of the vehicle and received through a microphone by performing ANC.

For example, the processor 510 generates sound waves having the same magnitude and opposite phase to the external noise of the vehicle to be transmitted to an occupant inside the vehicle and reproduces the same through a speaker to reduce the external noise of the vehicle.

Here, the processor 510 may reduce the external noise of the vehicle using a secondary path model algorithm using the secondary path model which is a digital filter obtained by measuring an actual secondary path S(s) which is the electrical and acoustic path between the speaker and the microphone and an actual secondary path and modeling the same into a transfer function.

Further, the processor 510 measures the level of residual noise remaining after the external noise of the vehicle is reduced.

Further, the processor 510 determines whether the measured level of the residual noise is greater than a threshold value, and if the level exceeds the threshold value, receives information on whether a user agrees to perform secondary path model re-measurement through the input/output interface 530.

Here, if a secondary path model error exceeds a certain level as a result of vehicle external noise reduction, the level of the residual noise also increases as a result of vehicle external noise reduction.

Therefore, through comparison between the residual noise level and the threshold value, it is possible to determine whether the secondary path model error exceeds a certain level.

Further, the processor 510 determines whether user agreement has been received, and if user agreement has been received, determines whether the vehicle engine is turned off and all occupants have alighted.

If the vehicle engine is turned off and all occupants have alighted as a result of determination, the processor 510 performs secondary path model re-measurement.

Here, the processor 510 may output white noise including all frequency ranges for a preset predetermined period of time through the speaker, and at the same time, receive sound through the microphone and store the same in the memory 550.

Here, the predetermined period of time may be set to any time, for example, 5 seconds.

Further, the processor 510 updates the secondary path model for performing ANC on the basis of the sound output through the speaker and the sound received through the microphone.

The updated secondary path model may be used for the next ANC.

The processor 510 determines whether the vehicle engine is turned on, and if the vehicle engine is turned on, performs ANC on the basis of the updated secondary path model to reduce noise.

The input/output interface 530 is connected to the processor 510 and directly obtains information or provides information to a user. For example, the input/output interface 530 receives information on whether the user agrees on secondary path model re-measurement.

The memory 550 may be various types of volatile or non-volatile storage media. Here, the memory 550 may store sound received through the microphone when white noise including all frequency ranges output through the speaker is input through the microphone during secondary path model re-measurement.

According to the above-described implementations of the present invention, it is possible to recommend re-measurement of a secondary path model to a user when the performance or stability of an ANC system deteriorates due to a secondary path model error and to automatically perform secondary path model re-measurement.

Furthermore, technology for securing ANC performance and stability by applying a secondary path model optimized for a corresponding vehicle is provided.

Furthermore, it is possible to re-measure a secondary path model optimized for a vehicle before occurrence of noise reduction performance deterioration, noise boosting, and divergence due to a secondary path model error and reflect the same in noise reduction.

The above-described present invention may be implemented as computer-readable code on a program-recorded medium. Computer-readable media includes all types of recording devices that store data that can be read by a computer system. Examples of computer-readable media include a hard disk drive (HDD), a solid state drive (SSD), a silicon disk drive (SDD), a ROM, a RAM, a CD-ROM, a magnetic tape, a floppy disk, an optical data storage device, and the like. Accordingly, the above detailed description should not be construed as restrictive in all respects and should be considered illustrative. The scope of the present invention should be determined by reasonable interpretation of the appended claims, and all changes within the equivalent scope of the present invention are included in the scope of the present invention.

What is claimed is:

1. An active noise control method for a vehicle, comprising:

performing active noise control (ANC) to reduce noise that is received through a microphone from an outside of the vehicle to an inside of the vehicle;

determining whether a level of residual noise of the noise reduced by the ANC is greater than a threshold value; and performing, based on a determination that the level of the residual noise is greater than the threshold value, secondary path model re-measurement when an engine of the vehicle is turned off.

2. The active noise control method of claim 1, further comprising:

updating, based on the engine of the vehicle being started, a secondary path model for performing the ANC according to a result of the secondary path model re-measurement; and reducing the noise from the outside to the inside of the vehicle by re-performing ANC based on the updated secondary path model.

3. The active noise control method of claim 2, wherein re-performing of the ANC comprises re-performing ANC when the engine of the vehicle is restarted.

4. The active noise control method of claim 1, wherein performing the secondary path model re-measurement comprises:

generating a white noise sound across a predetermined frequency range, outputting the sound through a speaker, receiving the output sound through the microphone, and storing the sound in a memory; and updating the secondary path model based on (i) the sound output through the speaker and (ii) the sound received through the microphone.

5. The active noise control method of claim 4, wherein performing the secondary path model re-measurement comprises:

receiving, based on the level of the residual noise being greater than the threshold value, information related to initiation of secondary path model re-measurement from an input/output interface; and based on the information indicating agreement to initiate the secondary path model re-measurement:

based on the engine of the vehicle being turned off and no occupants being present in the vehicle, generating the sound and outputting the sound through the speaker, receiving the output sound through the microphone, and storing the sound in the memory.

6. The active noise control method of claim 4, wherein the predetermined frequency range spans an entire range of audible frequencies.

7. An active noise control system for a vehicle, comprising:

at least one processor; and at least one computer memory operably connected to the at least one processor and storing instructions that, based on being executed by the at least one processor, perform operations comprising:

performing active noise control (ANC) to reduce noise that is received through a microphone from an outside of the vehicle to an inside of the vehicle, determining whether a level of residual noise of the noise reduced by the ANC is greater than a threshold value, and performing, based on a determination that the level of the residual noise is greater than the threshold value, secondary path model re-measurement when an engine of the vehicle is turned off.

8. The active noise control system of claim 7, wherein the operations further comprise:

updating, based on the engine of the vehicle being started, a secondary path model for performing the ANC according to a result of the secondary path model re-measurement; and reducing the noise from the outside to the inside of the vehicle by re-performing ANC based on the updated secondary path model.

9. The active noise control system of claim 8, wherein re-performing of the ANC is performed when the engine of the vehicle is restarted.

10. The active noise control system of claim 7, wherein performing the secondary path model re-measurement comprises:

generating a white noise sound across a predetermined frequency range, outputting the sound through a speaker, receiving the output sound through the microphone, and store the sound in the at least one memory; and updating the secondary path model based on a relationship between the sound output through the speaker and the sound input through the microphone.

11. The active noise control system of claim 10, wherein performing the secondary path model re-measurement comprises:

receiving, based on the level of the residual noise being greater than the threshold value, information related to initiation of secondary path model re-measurement from an input/output interface; and based on the information indicating agreement to initiate the secondary path model re-measurement:

based on the engine of the vehicle being turned off and no occupants being present in the vehicle, generating the sound and outputting the sound through the speaker, receiving the output sound through the microphone, and storing the sound in the at least one memory.

12. The active noise control system of claim 10, wherein the predetermined frequency range spans an entire range of audible frequencies.

* * * * *